United States Patent
Yusim et al.

(10) Patent No.: US 11,095,089 B2
(45) Date of Patent: Aug. 17, 2021

(54) ULTRAFAST PULSE LASER SYSTEM UTILIZING INTENSITY PULSE SHAPE CORRECTION

(71) Applicant: IPG PHOTONICS CORPORATION, Oxford, MA (US)

(72) Inventors: Alex Yusim, Boston, MA (US); Igor Samartsev, Westborough, MA (US); Oleg Shkurihkin, Shrewsbury, MA (US)

( * ) Notice: Subject to any disclaimer, the term of this patent is extended or adjusted under 35 U.S.C. 154(b) by 0 days.

(21) Appl. No.: 16/088,121

(22) PCT Filed: Mar. 29, 2017

(86) PCT No.: PCT/US2017/024690
§ 371 (c)(1),
(2) Date: Sep. 25, 2018

(87) PCT Pub. No.: WO2017/172874
PCT Pub. Date: Oct. 5, 2017

(65) Prior Publication Data
US 2020/0303893 A1    Sep. 24, 2020

Related U.S. Application Data

(60) Provisional application No. 62/315,712, filed on Mar. 31, 2016.

(51) Int. Cl.
*H01S 3/10* (2006.01)
*H01S 3/13* (2006.01)
*H01S 3/067* (2006.01)
*H01S 3/00* (2006.01)

(52) U.S. Cl.
CPC .......... *H01S 3/1305* (2013.01); *H01S 3/0057* (2013.01); *H01S 3/06758* (2013.01); *H01S 3/1003* (2013.01); *H01S 3/10015* (2013.01); *H01S 3/1301* (2013.01)

(58) Field of Classification Search
CPC .. H01S 3/1305; H01S 3/20015; H01S 3/1003; H01S 3/0057
See application file for complete search history.

(56) References Cited

FOREIGN PATENT DOCUMENTS

WO    WO2007041096    * 4/2007

* cited by examiner

*Primary Examiner* — Michael Carter
(74) *Attorney, Agent, or Firm* — Yuri Kateshov, Esq.; Caroline J. Roush, Esq.

(57) ABSTRACT

The ultrafast pulse fiber laser system is configured with scalable output power and operative to reduce degradation of pulse integrity. The disclosed laser system is configured to suppress the pulse distortion through improvement of initial pulse contrast between main and side pulses and improved pulse shape using chirped pulse amplification and a fast intensity modulator driver by a corrected electrical signal that is generated from the original optical signal. The structure providing the improvement includes the photodiode, which is operative to measure the chirped optical pulse and convert it to the electrical signal, and analog electronics that quickly converts the electrical signal to the required signal that suppress the side pulses.

12 Claims, 8 Drawing Sheets

3W, 300kHz, FBG Tanh(1.2x) Apodization,
0.7 psec 3W, 300kHz, FBG Tanh(1.2x) Apodization,
0.75 psec 3W, 300kHz,
FBG Tanh(1.2x)
Apod.,
1.0 psec known art (a)

(b)

Fig. 1. (a) Experimental and simulated spectrum of a main pulse and with a post pulse. (b) corresponding spectra after nonlinear amplification. The B-integral is about 3 rad.

Known art

Known art

Known art

Known art

Known art

ULTRAFAST PULSE LASER SYSTEM UTILIZING INTENSITY PULSE SHAPE CORRECTION

BACKGROUND OF THE DISCLOSURE

Field of the Disclosure

The present invention relates to an ultrafast pulse fiber laser system with scalable output power with reduced degradation of pulse integrity. In particular, the inventive fiber laser system is configured to suppress the pulse distortion through improvement of initial pulse contrast between main and side pulses and improved pulse shape using chirped pulse amplification and a fast intensity modulator driver by a corrected electrical signal that is generated from the original optical signal.

Prior Art

Ultrafast pulse lasers generate pulses that are shorter than 20 picoseconds and are as short as five femtoseconds. These lasers found application in medicine and in industry. Laser machining using ultrashort pulses work on the principle of cold ablation via multiphoton absorption. These types of pulses generate very small heat affected zone and nearly no kerf. This permits their usage in machining finely detailed parts or machining materials that are highly susceptible to heat. Nearly all materials can be machined with such pulses since the process of multiphoton absorption does not require the wavelength of the laser to overlap to the absorption band of the material.

Pulse energies up to 100 uJ are required for the micromachining applications and up to 20 uJ for Ophthalmology applications. Other scientific applications require even higher pulse energies. Extracting sufficient energy keeping the pulse from distorting is an issue due to the non-linear optical effect of self-phase modulation (SPM) as high peak power pulses propagate through materials. This material is typically the material providing gain to amplify the pulses, so it is difficult to avoid the effect. One popular method to extract more pulse energy is called chirped pulse amplification (CPA). In this method the pulse are stretched in time by adjusting the phase of each longitudinal mode within the spectral envelope. Bulk gratings, prisms, fiber, chirped fiber Bragg gratings or chirped volume Bragg gratings can be used to stretch the pulses by introducing this dispersion. The pulses can then be amplified through the gain material achieving higher pulse energy before reaching the peak powers that can induce SPM. Finally, the pulses are compressed with matching dispersion elements to recompress the pulses back down to picosecond or femtosecond pulse durations achieving the required pulse energy and the ultrashort pulses.

Even though CPA method can be used to extract significant pulse energies, this method is still limited. The ultrafast pulses exhibit increased pulse duration with increased peak output power due to optical nonlinearity such as SPM. When ultrashort optical pulses propagate through any material with a non-zero nonlinear index of refraction there is an accumulation of nonlinear phase shifts through the process of SPM. The pulses start to degrade forming pre-pulses or post pulses (see FIGS. 1-5) increasing the total duration of the temporal envelope. This occurs as the peak power is increased, as shown in FIG. 2, or the pulses propagate sufficient distance through the material.

The generation of side pulses in time domain of FIG. 1 corresponds to the existence of intensity ripples in spectral domain, as illustrated in FIG. 3. The intensity of the ripples increases with higher peak powers, as shown in FIG. 4. Thus, the presence of the side pulses/intensity ripples reduces peak power and pulse energy which is disturbing since many applications require ultrashort pulse with high peak power and high pulse energy.

The reduction of nonlinearities in fiber laser systems and performance improvements can be achieved by several methods. For example, nonlinearities may be somewhat suppressed by using material with lower nonlinear index of refraction, increasing the beam size/mode area, or decreasing nonlinear interaction length. Such optimization is initially performed to improve the output pulse performance. Unfortunately, excitation of higher order modes limits the maximum achievable mode area in optical fiber and the length is limited due to the pump absorption of the active fibers.

In one method, efforts are applied to generate the ultrafast pulses with a parabolic spectral shape. Referring to FIG. 5, in contrast to other pulse shapes, the peak power of parabolic pulses is not affected by increased nonlinearity, represented in the drawing by a B-integral, in the fiber laser system. In another method shown in FIG. 6, chirped pulses are substantially less affected by nonlinearities if the initial pulse contrast between main and side pulses prior to amplification is high, i.e., side pulses initially contain nearly insignificant energy.

Achieving good pulse contrast and parabolic spectral shape is difficult to generate directly from the seed laser. Post pulse shaping of the intensity and phase can achieve the desired results. A number of techniques have been proposed including those techniques in time domain and also in spatial domain. Spatial domain techniques include using spatial light modulator and mapping the output spectrum into spatial domain. Elements such as liquid crystal phase modulators, MEMs, or acousto-optic modulators control the intensity and/or phase across the spatial beam profile. This technique is fairly bulky and not monolithic.

Temporal domain techniques are typically not used due to the limitation on high speed electronics. The electronics to directly synthesize the pulse shape are expensive and bulky. It has been proposed to use a phase modulator driven by the measured photodiode signal to correct SPM of stretched optical pulses. This method is significantly less complicated, more compact and less expensive. However, this technique does not directly correct the spectral intensity profile in order to achieve smooth parabolic spectral shape.

This invention addresses the issue of pulse distortion of ultrafast laser system by correcting the spectral intensity profile in time domain using a fast intensity modulator and the measured optical signal via a fast photodetector.

SUMMARY OF THE DISCLOSURE

This need is met by the disclosed ultrafast master oscillator power fiber amplifier CPA laser system that utilizes an intensity modulator to correct the spectral profile of the linearly chirped pulses of optical signal after the pulse stretcher in time domain. The pulse's spectral profile is mapped in time domain by using a linear chirped pulse stretcher. A fast intensity modulator such as a Mach-Zander Lithium Niobate Modulator, a Mach-Zander Indium Phosphide Semiconductor Modulator, or high speed semiconductor optical amplifier can be used in conjunction to high speed electronics to correct the spectral shape of the pulses in time domain. The intensity modulator has a specific or arbitrary waveform generated from the optical signal itself to correct the spectral ripple.

In accordance with one of aspects of this disclosure, the disclosed CPA laser system for outputting near transform limited pulses is configured with a beam splitter receiving a train of chirped pulses of light signal in a ps-ns pulse duration range and operative to divide each light signal into first and second portions. The second portion of the light signal is coupled into an optoelectronic converter which converts the received second portion of the light signal into a radio-frequency (RF) signal. The first portion of the light signal is guided towards and coupled into an intensity modulator. The electrical signal is generated from the second portion of the light signal converted in the optoelectronic converter. The electrical signal is coupled into at least one radio-frequency (RF) generator scheme which processes the electrical signal applied to the intensity modulator so as to correct spectral intensity profile of the chirped pulse at an output of the intensity modulator.

In accordance with a second aspect of the disclosure considered in combination with the previous and any of the subsequent aspects, the CPA laser system includes a single transverse mode (SM) seed laser configured as a gain-switched or mode locked laser which outputs the train of sub-ns pulses of light signal. The SM seed laser may be configured as a gain-switched or mode locked laser. The sub-ns pulses that may or may not acquire a chirp right after the seed are further coupled into a pulse stretcher located between the SM seed laser and beam splitter. The stretcher is configured to chirp sub-ns pulses to a ps-ns pulse duration range which allows reducing a power density of light signal. The configuration of the stretcher may include pairs of diffraction gratings, or fiber Bragg gratings or volume Bragg grating or prisms or any other suitable configuration and combination of these. Further, the structure of disclosed system of this aspect also includes a single or multiple amplifying stages each provided with a fiber amplifier which receives and amplifies the first portion of light signal. Finally, the disclosed structure of the second aspect is further configured with one or multiple pulse compressors receiving the amplified first portion of light signal of each pulse with the corrected spectral profile and operative to output the train of sub-ns pulse. The pulse compressor has a configuration including a Tracey Grating compressor, prism compressor, or Chirped Volume Bragg Grating compressor or a combination of these. Other components such as pulse picker can be used to decrease the pulse repetition rate for higher pulse energy extraction.

The third aspect of the CPA laser system of one of the above-mentioned and following aspects relates to the specifics of the beam splitter and optoelectronic converter. The beam splitter preferably includes a fiber coupler configured to divide each light signal so that the first portion of light signal, coupled to the intensity modulator, is greater than or smaller than or equal to the second portion of the light signal. The optoelectronic converter processing the second portion of light signal includes a fast photodetector operating in a bandwidth of up to several hundred gigahertz (GHz). The photodetector converts the received second portion of light signal of each chirped pulse into the RF signal. The electrical intensity of the RF signal corresponds to an optical intensity of light in each chirped pulse.

In a further aspect, the RF generator scheme of any of the above-disclosed aspects as well as any of the below-disclosed aspects is configured with a series of connected analog components operating at high frequency ranging between 0.5 and 500 GHz. The RF signal from the optoelectronic converter is coupled into an RF filter. The RF filter is operative to pass a predetermined spectral region of each RF signal. The filtered RF signal is further coupled into an RF inverter flip-flopping the filtered region of each RF signal. Finally, an RF amplifier is coupled to the output of the inverter and operative to amplify the flip-flopped filtered region of each RF signal which is then applied to the intensity modulator to correct the spectral intensity profile of the first portion of light signal.

The components of the CPA laser system disclosed in any of the above and below discussed aspects should be fast. For chirped pulses that are at least 100 ps, the intensity modulator has to be fast enough to correct for intensity spectral profile. For such pulses, at least 20 GHz intensity modulator and 20 GHz fast RF electronics are required. With the increased chirped pulse duration, the spectral resolution also increases and finer pulse shaping can be accomplished. In addition, as the intensity modulator technology with accompanying electronics improves, for example, to 500 GHz, further improvement can be achieved in resolution for spectral pulse shaping. As an example, if one uses 100 GHz intensity modulator presently readily available and a chirped pulse duration of 1.5 ns, it is possible to have less than 1% resolution of the bandwidth. Even for 40 GHz and 0.5 ns chirped pulse duration, the resolution would be 5% of the bandwidth and is sufficient to correct optical spectrum. As another example, if one generates 1.5 ns chirped pulses, it is possible to use 10 GHz intensity modulator to achieve resolution of less than 7% of the bandwidth.

In accordance with another aspect, the sub-ns CPA laser system of any of the above-mentioned and below discussed aspects includes the intensity modulator having a Mach-Zehnder interferometer structure. The latter is configured with first and second arms which guide respective replicas which are formed upon splitting of the first portion of light signal at the input of the interferometer. One of arms includes a phase modulator which receives the amplified RF signal inducing a phase shift on the replica of the first portion of light signal guided in the first arm. Both replicas interfere at the output of the Mach-Zehnder interferometer so as to convert a phase difference between the first and second replicas to the correct intensity profile of the first portion of light signal in each chirped pulse.

A further aspect of the disclosure relates to the sub-ns CPA laser system of any of the previous five and below disclosed aspects includes a second RF generator scheme configured identically to the one RF generator scheme and receiving the RF signal from the optoelectronic converter. The intensity modulator being the Mach-Zehnder interferometer provided with first and second waveguide arms which guide respective replicas of the first portion of light signal. The arms include respective one and second phase modulators which receive amplified RF signals with different amplitudes from respective one and second RF generator schemes. Both RF signals induce respective phase shifts on the replicas of the first portion of light signal which interfere at the output of the Mach-Zehnder interferometer so as to convert a phase difference between the first and second replicas to the correct intensity profile of the first portion of light signal.

According to the seventh aspect of the disclosure, the disclosed CPA laser system of any of the above and any of the following aspects includes a second RF signal generator generating a second RF signal which is amplified in the second RF generator. The RF signals generated by respective RF signal generator schemes have different amplitudes.

Thereafter these two amplified electrical signals are applied to the intensity modulator configured as a Mach-Zehnder interferometer with first and second waveguide arms which guide respective replicas of the first portion of light signal. The first and second arms are configured with respective phase modulators imposing respective and different phase shifts on the first and second replicas. The replicas are then interposed at the output of the Mach-Zehnder interferometer so as to convert a phase difference between the first and second replicas to correct the intensity profile of the first portion of light signal in each chirped pulse.

The next aspect of the disclosure relates to the CPA laser system of any of 1 through 4 aspects which has the intensity modulator configured as a semiconductor optical amplifier. The semiconductor amplifier operates on a gain increasing principle resulting in a smooth envelope of the intensity profile of the first portion of light signal at the output of this amplifier.

In accordance with another aspect, the sub-ns CPA laser system of any of the above-mentioned aspects includes a fiber delay line configured to synchronize the amplified RF signal with the first portion of light signal in the intensity modulator. The fiber delay line may include a loop of fiber and/or use a multi part spool with a fiber wrapped around multiple parts of the spool. The parts are controllably displaceable relative to one another so as to adjust a tensile force upon the wrapped fiber which facilitates the synchronization process.

In accordance with another aspect, the ultrashort pulse laser system of any of the above-disclosed aspects uses the intensity modulator that has a specific waveform generated from the optical signal itself to self-correct the spectral ripple after the intensity modulator prior to all or some of the amplifier stages. The self-correction is performed using high speed analog electronics which receives an electrical signal corresponding to the tapped incident optical signal and manipulates it to generate the complementary waveform to compensate for the spectral ripple. The tunability of the amplitude of the manipulated electrical signal allows for fine tuning to help suppress any residual spectral ripple. The benefit of such configuration is that the output after the intensity modulator is autocorrected with any changes to spectral shape of the seed laser or other components.

A further aspect is concerned with the intensity modulator of the disclosed CPA laser system of any of previous and subsequent aspects. In particular, the intensity modulator has an arbitrary waveform chosen such that spectral ripple of the first portions of the optical signal is corrected and/or generating a parabolic spectral shape. The accompanying electronics are able to generate high speed waveforms to synthesize an electrical signal of the tapped off optical signal using a Field Programmable Gate Array (FPGA) or similar digital methods such as ASICs (Application Specific Integrated Circuit) or other equivalent ICs.

BRIEF DESCRIPTION OF THE DRAWINGS

The above and other aspects of the disclosure will be explained in detail in conjunction with the following drawings, in which.

SPECIFIC DESCRIPTION

Figure 1A:
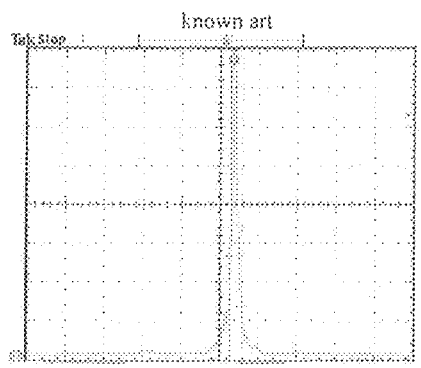
FIGS. 1A-1C illustrate the time domain intensity profile of a linearly chirped pulse accompanied by side-pulses generated in accordance with different average pulse powers.
Figure 1B:
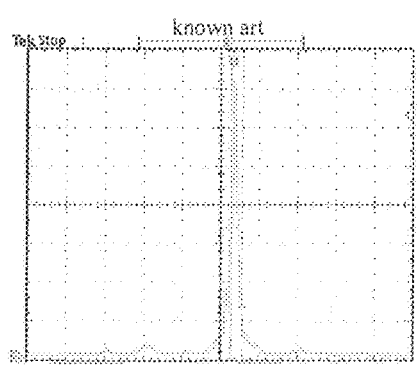
Figure 1C:
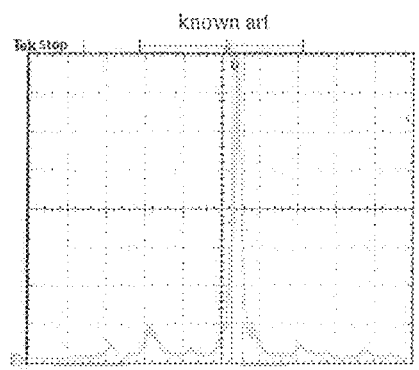
Figure 2:
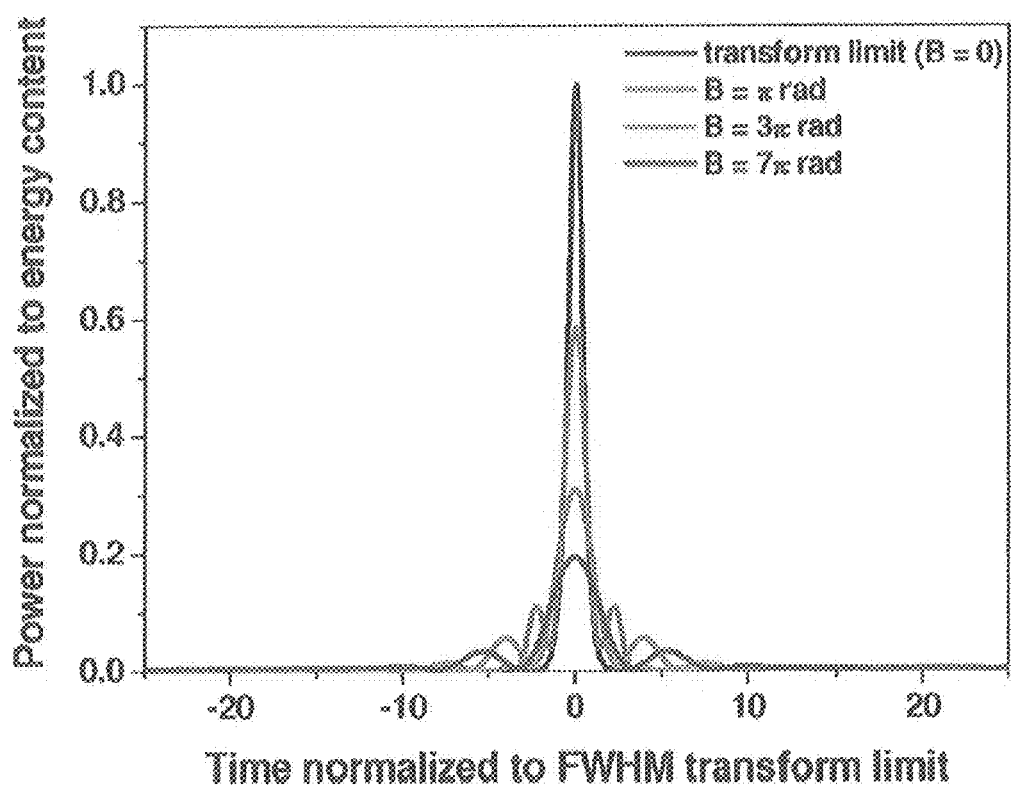
FIG. 2 illustrates the time domain peak power profile of the linearly chirped pulse at different degrees of system nonlinearity.
Figure 3A:
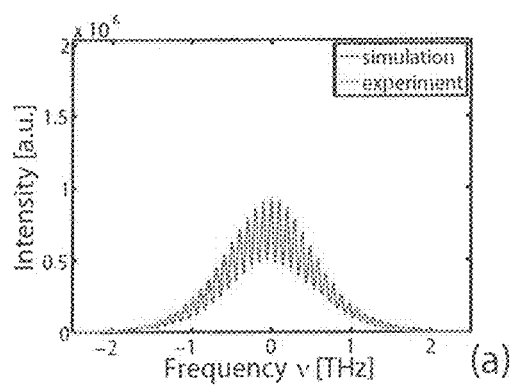
FIGS. 3A-3B illustrate the frequency domain intensity profile of the linearly chirped pulse before and after amplification.
Figure 3B:
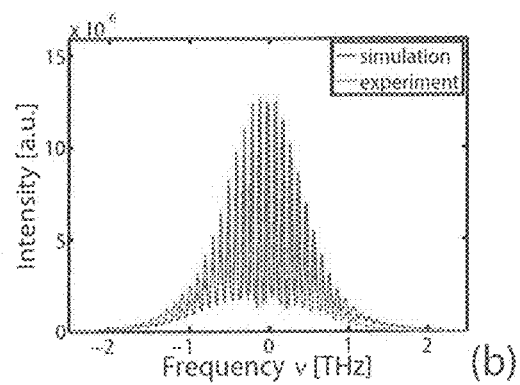
Figure 4A:
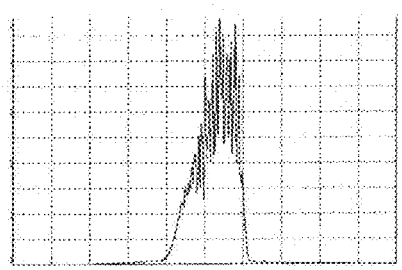
FIGS. 4A-4C illustrate the frequency domain intensity profile of the linearly chirped pulse at different average pulse powers.
Figure 4B:
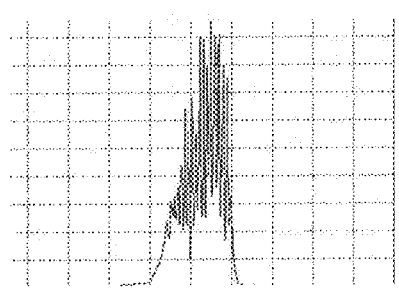
Figure 4C:
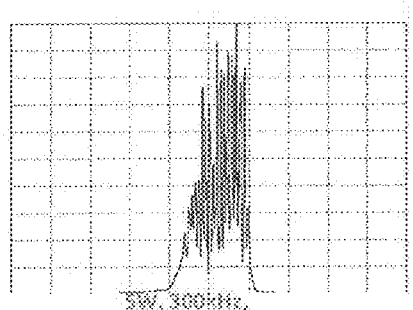
Figure 5:
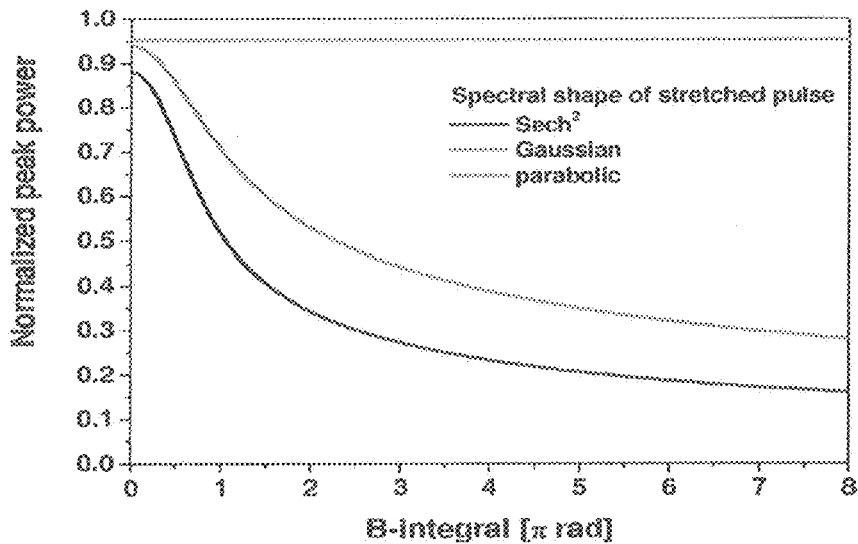
FIG. 5 illustrates dependence of a pulse peak power on different spectral shapes of stretched pulse.
Figure 6:
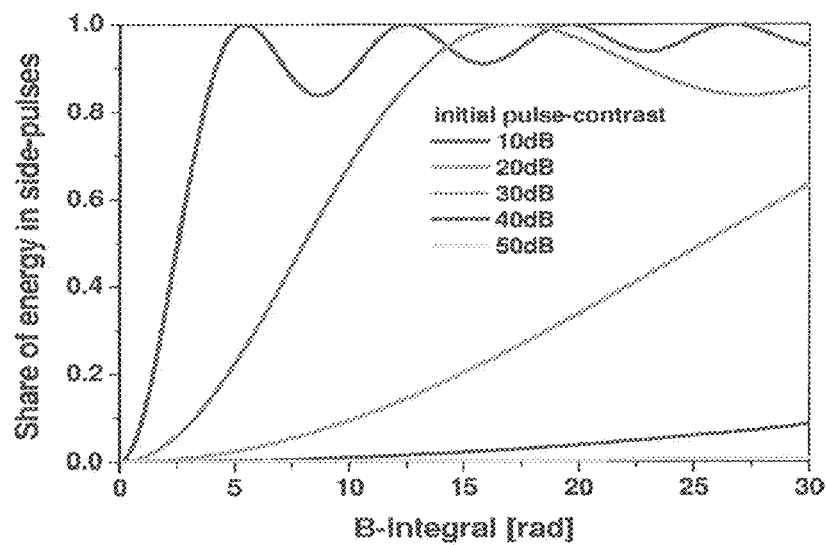
FIG. 6 illustrates dependence of energy contained in side pulses on the degree of the system's nonlinearity.

Reference will now be made in detail to embodiments of the invention. Wherever possible, same or similar reference numerals are used in the drawings and the description to refer to the same or like parts or steps. The drawings are in simplified form and are not to precise scale. The term "couple" and similar terms do not necessarily denote direct and immediate connections, but also include connections through intermediate elements or devices.

The inventive ultrafast pulse fiber laser system 10 shown in FIGS. 7-11 is configured with a pulse source 12, such as mode locked or gain-switch laser, generating a train of ultrashort sub-ns pulses 14 of signal light. The pulses 14 that may or may not acquire some chirp right after pulse source 12 undergo linear chirping in a pulse stretcher 16 outputting chirped pulse with a spectral shape 18. Given only as an example, the pulse duration may be increased from a 1 ps pulse 14 to pulses 18 in a nanosecond range. The pulse stretcher 16 may have a variety of configurations including among others, bulk gratings, prisms, fiber, chirped fiber bragg gratings or chirped volume bragg gratings can be used to stretch the pulses by introducing this dispersion. Preferably, stretcher 16 is mounted to a pigtailed circulator.

The stretched pulses 18 of light signal, propagating through a beam-splitter or tap coupler 20 are split into two portions that may be equal or unequal with one of the portions being smaller or greater than the other one. One of the portions is directly coupled into an intensity modulator 22. The other portion is tapped to be received by an optoelectronic converter having a configuration of a photodiode 24 that generates an electrical, RF signal from the received tapped portion of light signal. The electrical signal imitates a temporal shape of chirped light signal 18 which are further synthesized in tunable RF generator scheme 25.

For chirped pulses that are at least 100 ps, intensity modulator 22 has to be fast enough to correct for intensity spectral profile of stretched pulses 18. For such pulses, at least 10 gigahertz (GHz) intensity modulator, RF generator scheme 25 should be fast in a low GHz range. As the chirped pulse duration increases, the spectral resolution increases as well and finer pulse shaping can be accomplished. In addition, as the intensity modulator technology with accompanying electronics improves to 100 GHz and 200 GHz, further improvement can be achieved in resolution for spectral pulse shaping. As an example, if one uses 100 GHz intensity modulator 22 presently readily available and a chirped pulse duration of 1.5 ns, it is possible to have less than 1% resolution of the bandwidth. Even for 40 GHz and 0.5 ns chirped pulse duration, the resolution would be 5% of the bandwidth and is sufficient to correct optical spectrum. As another example, if one generates 1.5 ns chirped pulses, it is possible to use 10 GHz intensity modulator to achieve resolution of less than 7% of the bandwidth.

The synthesized RF signal is coupled into intensity modulator 22 to smooth out intensity ripples 26 and/or provide a maximally possible parabolic shape at the output of the modulator. As shown, corrected light signal at the output of modulator 22 has a time domain intensity profile 28 free from intensity ripples. Since sub-ns pulses 14 undergo a linear chirp, the frequency domain intensity profile of modulated light signal at the output of intensity modulator 22 matches profile 28 in time domain. One of ordinary skill in the art of lasers readily recognizes that if only a parabolic pulse shape is required at the output of intensity modulator 22, electronics 25 can operate in a single digit GHZ range which is substantially lower than the range required for compensating intensity ripples. The absence of intensity ripples at the modulator's output is a direct indication of side-pulse suppression.

The modulated first portion of light signal is further amplified. The amplification may be done in a single amplifying stage or multiple amplifying stages 32, 34. Regardless of the number of amplifying stages, a light source including seed laser 12 and one or more amplifying stages has a master oscillator power fiber amplifier (MOPFA) configuration.

Frequently, pulse energies should be adjusted. Typically, it is desirable to increase pulse energies which can be done by reducing the pulse repetition rate. This can be achieved by placing a pulse picker 36 anywhere between the seed laser and the amplifier. The amplifier will then act only on the wanted pulses.

Like any CPA system, inventive system 10 includes a pulse compressor 38 operating to compress the chirped amplified pulses. Dechirping is accomplished by means of a Treacy Grating compressor, prism compressor, or Chirped Volume Bragg Grating or any combination of the above.

Summarizing the above, the inventive ultrafast pulse system is capable of suppressing the pulse distortion through the increased initial pulse contrast using a fast intensity modulator driver by a corrected electrical signal that is generated from the original (second portion) of light signal.

Figure 7:
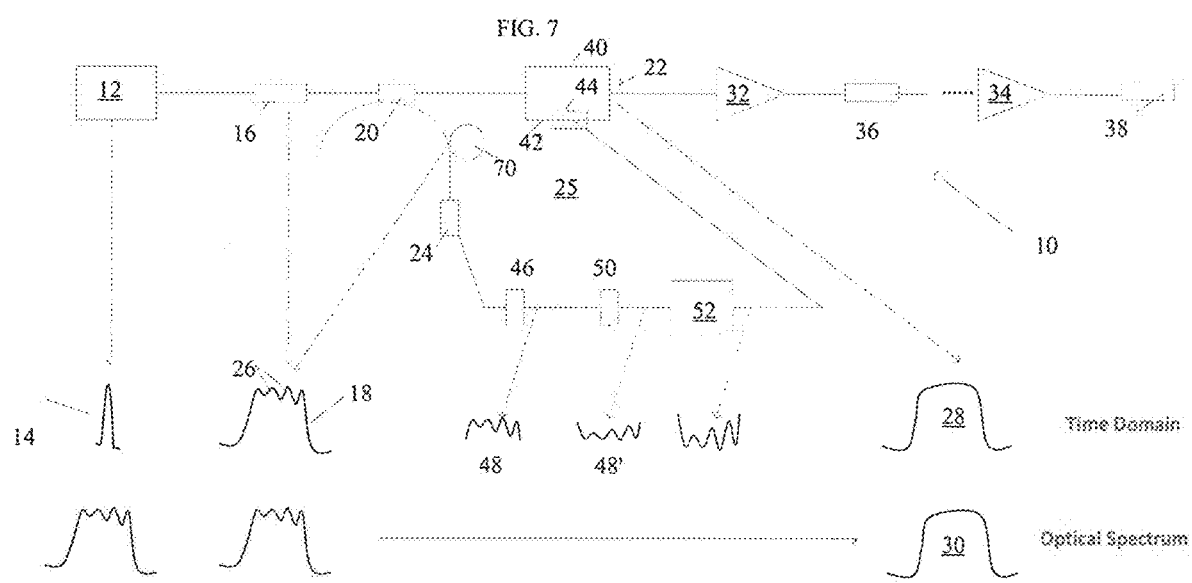
FIG. 7 illustrates one aspect of the inventive sub-ns pulsed laser system.

Referring specifically to FIG. 7, intensity modulator 22 has a Mach-Zehnder (MZ) interferometer used for controlling the amplitude of an optical wave. The first portion of signal light is split up into two replicas guided along respective waveguide arms 40 and 42. One of the arms, for example arm 42, is provided with a phase modulator 44. If a voltage is applied across phase modulator 44, a phase shift is induced for the replica passing through arm 42. When the replicas are recombined at the output of the MZ interferometer, the phase difference between them is converted to an amplitude modulation due to the interference between two replicas, as explained below.

The RF generator scheme 25 processes the RF signal received from photodiode 24 and generates a complementary signal applied across phase modulator 44 in such a way that a temporal shape of the light signal at the output of MZ interferometer 22 is free from intensity ripples. In order to flatten intensity ripples in the light signal, intensity ripples 26 in arms 40 and 42 compensate and preferably cancel out each other.

This is realized by RF generator scheme 25 including an RF filter 46 operative to isolate the desired portion of the electrical signal, i.e., a top or central portion 48 with high frequency intensity ripples 26. This is done by filtering out low frequency side portions of the electrical signal and passing high frequency top portion 48 to an RF inverter 50. The latter inverts the received top portion, as denoted by reference numeral 48', such that when the replicas of light signal interfere at the output of MZ interferometer 22, respective ripples 26 compensate and preferably cancel each other out. The inverted central portion of the electrical signal is applied to an RIF amplifier 52 adjustable so that the amplitude of ripples 26 of the modulated replica matches that of the replica guided along arm 40 of modulator 22.

Figure 8:
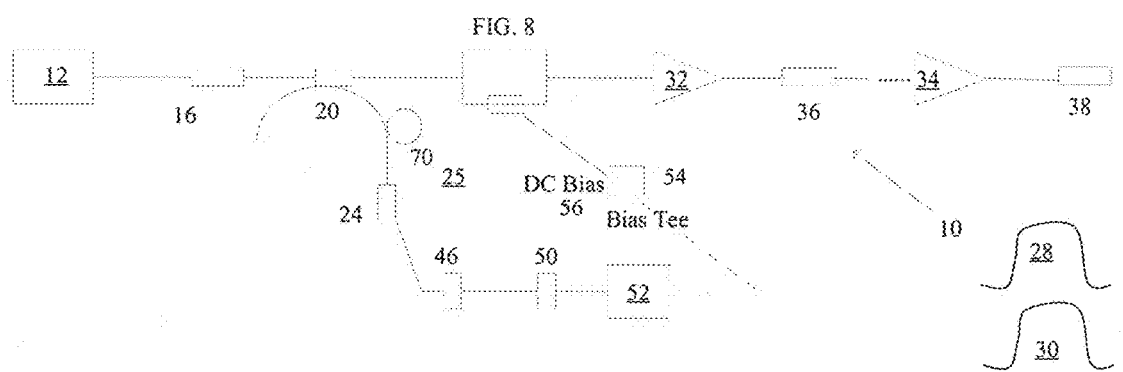
FIG. 8 illustrates details of the disclosed pulsed laser system of FIG. 7.

Referring to FIG. 8, as the artisan knows the complimentary signal applied across phase modulator 44 consist of DC and RF components. Typically, RF amplifier 52 of FIG. 7 has a configuration operative to meet this requirement. If, however, RF amplifier 52 does not have the capability of providing a DC component, RF generator 25 additionally has a DC source 56 and a bias tee 54 operative to combine the RF and DC components. The rest of the schematics of FIG. 8 is identical to that of FIG. 7

Figure 9:
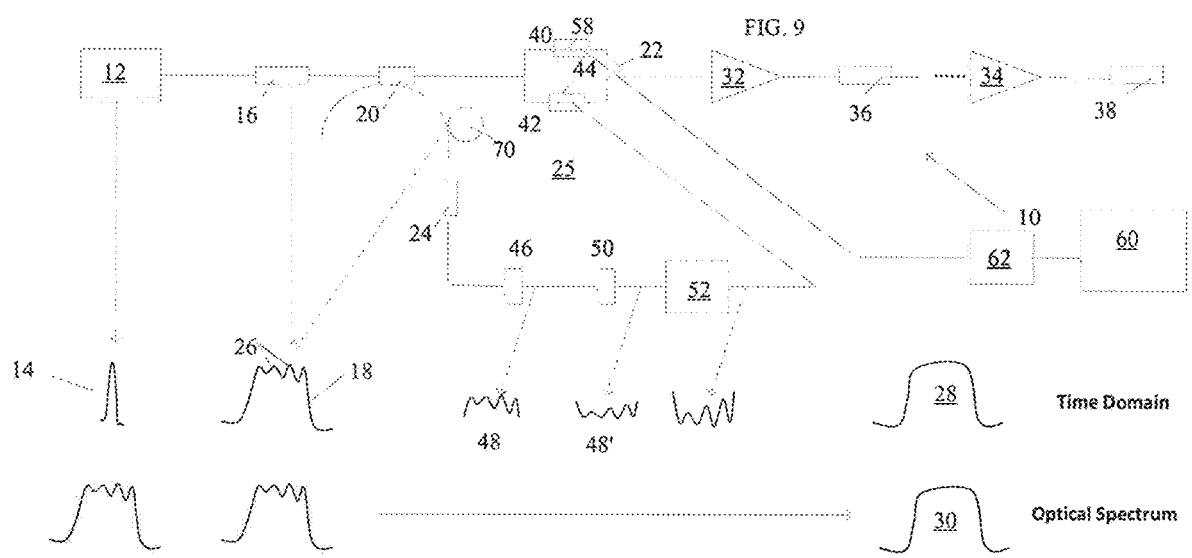
FIG. 9 illustrates another aspect of the disclosed sub-ns laser system.

Referring to FIG. 9, in addition to phase modulator 44 of FIGS. 7 and 8, an additional phase modulator 58 is provided in arm 40 of MZ interferometer 22. Based on the same intensity modulation principle, two electrical signals with different amplitudes are applied to respective phase modulators 40 and 58. The second complementary signal applied to phase modulator 58 can be generated by an external electronic including a separate RF generator scheme 55. The latter may have a signal generator 60 with an arbitrary waveform and a tunable RF amplifier 62 operating in a manner well known to the one of ordinary skill.

Figure 10:
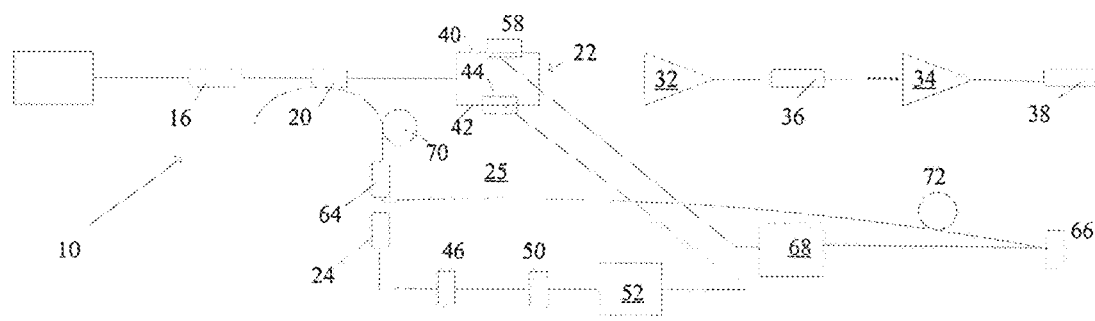
FIG. 10 illustrates still another aspect of the disclosed sub-ns pulsed laser system.

FIG. 10 instead of external electronics with an arbitrary waveform of FIG. 9, additional phase modulator 58 receives a drive voltage signal generated from its own optical signal. In particular, system 25 has an additional coupler 64 that splits the tapped off portion of the optical signals into two sub-portions one of which is applied to photodiode 24 and the other sub-portion is guided to an additional photodiode 66. The latter generates the electrical signal which is applied a second RF generator amplifying the received electrical signal which is further applied across phase modulator 58. The driving voltages applied to respective phase modulators 44 and 58 differ from one another which allows the modulated replicas of the first portion interfere at the output of MZ interferometer 22. As a result of the interference, the near transform limited pulses acquire the desired shape in both time and spectral domains 28, 30 respectively. Note that the schematic illustrated in this figure may control phase modulation of the first replica of the light signal, not its intensity. This can be realized by deliberately tuning RF amplifiers so that both voltages applied to respective phase modulators 44 and 58 are equal.

Figure 11:
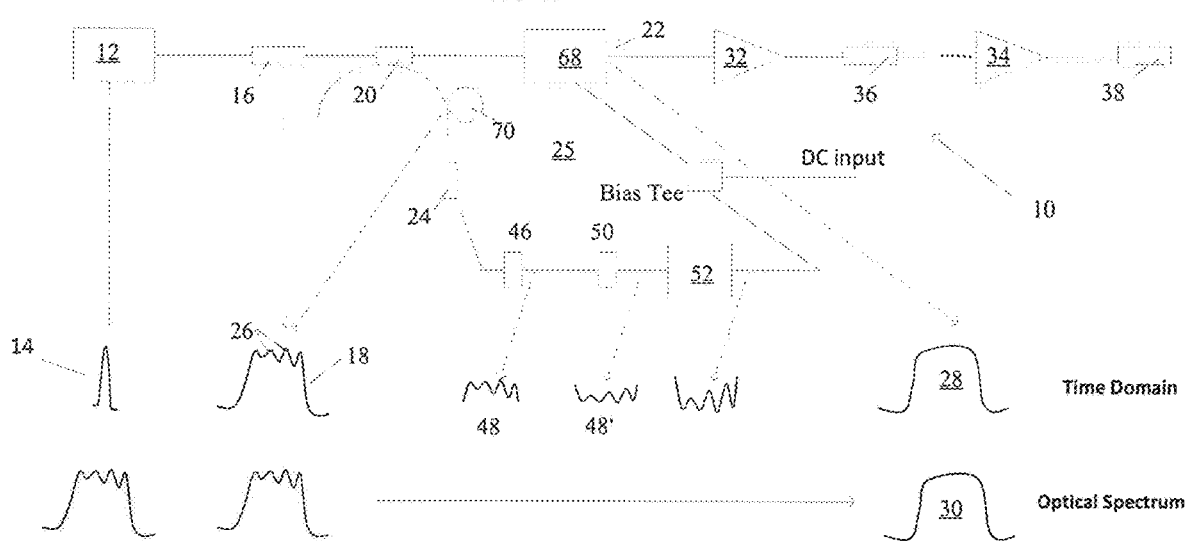
FIG. 11 illustrates a further aspect of the disclosed sub-ns pulsed laser system.

Referring to FIG. 11, the MZ interferometer is replaced with a semiconductor optical amplifier 68 providing intensity modulation of the first portion of the light signal. As known to one of ordinary skill, this type of amplifiers operates based on a gain principle. In other words valleys between adjacent ripples 26 are amplified to provide a smooth parabolic shape of ripple free near transform limited pulses 28 and 30 similar to the previously disclosed schematics.

Referring to system 25 of FIGS. 7-11, the replica of first portion of light signal and electrical signal should be synchronized when applied to the phase modulator. This is done by providing a loop of fiber 70 dealing with the second portion of light signal before it hits photodiode 24 in FIGS. 7-9 and 11. In the embodiment of FIG. 10, where intensity modulator 22 is provided with two phase modulators 44 and 58, an additional time delay loop 72 is formed between coupler 64 and photodiode 66. The implementation of this feature may include a specifically selected additional length of fiber. In addition, a spool with a fiber wrapped around two separate spool parts, which are controllably displaceable relative to one another, can be implemented for fine tunning. A simple screw may be sufficient for the operator to displace the two spool parts so as to provide the desired tension to the fiber which allows electrical and optical signals to be synchronously applied to single phase modulator 44 or both modulators 44 and 58 of FIG. 10.

Thus ultrashort pulse laser system 25 can use the intensity modulator 22, 68 that has an arbitrary waveform such that spectral ripple is corrected and/or generating a parabolic spectral shape after the intensity modulator prior to all or some of the amplifier stages. The accompanying electronics are able to generate high speed waveforms using a Field Programmable Gate Array (FPGA) or similar digital methods such ASICs (Application Specific Integrated Circuit) or other equivalent ICs.

The intensity modulator 22, 68 has a specific waveform generated from the optical signal itself to self-correct the spectral ripple after the intensity modulator prior to all or some of the amplifier stages. The self-correction is performed using high speed analog electronics. The fast photodiode 24, 66 generates the electronic signal from the tapped incident optical signal after pulse stretcher 16 prior to some or all amplifier stages. The electrical signal is delayed in time using the length of fiber 70, 72 before the photodiode such that the applied RF signal matches the optical pulses that are propagating through the intensity modulator. The RF signal has to be manipulated to generate the complementary waveform to compensate for the spectral ripple. The tunability of the amplitude of the signal allows for fine tuning to help suppress any residual spectral ripple. The benefit of such configuration is that the output after the intensity modulator is autocorrected with any changes to spectral shape of the seed laser or other components.

Having described the embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

The invention claimed is:

1. A sub-nanosecond (sub-ns) pulsed laser system for outputting near transform limited pulses, comprising:
a beam splitter receiving a train of chirped pulses of light signal in a ps-ns pulse duration range and operative to divide each light signal into first and second portions;
at least one optoelectronic converter receiving and converting the second portion of the light signal into a first radio-frequency (RF) signal;
an intensity modulator receiving the first portion of each light signal; and
at least one tunable radio-frequency (RF) generator scheme receiving and processing the first RF signal applied to the intensity modulator so as to correct spectral intensity profile of the chirped pulse at an output of the intensity modulator.

2. The sub-ns pulsed laser system of claim 1 further comprising a single transverse mode (SM) seed laser configured as a gain-switched or mode locked laser which outputs the train of chirped sub-ns pulses of light signal;
a pulse stretcher located between the SM seed laser and beam splitter and configured to chirp sub-ns pulses to the ps-ns pulse duration range;
a single or multiple amplifying stages each provided with a fiber amplifier which receives and amplifies the first portion of light signal with the corrected spectral intensity profile;
a pulse compressor receiving the amplified first portion of light signal of each pulse with the corrected spectral profile and operative to output the train of sub-ns pulse,
wherein the chirped pulses each acquire an improved pulse contrast in time domain and spectral ripples in frequency domain at an input of the beam splitter.

3. The sub-ns pulsed laser system of claim 2 further comprising at least one fiber delay component guiding the second portion of light signal between the beam-splitter and optoelectronic converter to synchronize the amplified RF signal and the first portion of light signal which is coupled into the intensity modulator.

4. The sub-ns pulsed laser system of claim 3, wherein the time delay component includes a multi part spool with a fiber wrapped around multiple parts which are controllably displaceable relative to one another.

5. The sub-ns pulsed laser system of claim 1, wherein the beam splitter includes a fiber coupler configured to divide each light signal so that the first portion of light signal, coupled to the intensity modulator, is greater than or smaller than or equal to the second portion of the light signal guided to the optoelectronic converter, the one optoelectronic converter being a fast photodetector operating in a bandwidth of up to several hundred gigahertz (GHz) and converting the received second portion of light signal of each chirped pulse into the one RF signal which is proportional to an optical intensity of light in each chirped pulse.

6. The sub-ns pulsed laser system of claim 1, wherein the one tunable RF generator scheme is configured with;
an RF filter coupled to an output of the one optoelectronic converter and operative to pass a predetermined region of the first RF signal,
an RF inverter flip-flopping the filtered region of the first RF signal, and
an RF amplifier operative to amplify the flip-flopped filtered region of the first RF signal applied to the intensity modulator to correct the spectral intensity profile of the first portion of light signal.

7. The sub-ns pulsed laser system of claim 1, wherein the intensity modulator is a Mach-Zehnder interferometer provided with first and second waveguide arms which guide respective replicas of the first portion of light signal, at least first arm including a phase modulator which receives the amplified first RF signal inducing a phase shift on the replica of the first portion of light signal guided in the first arm, the first and second replicas being interposed at an output of the Mach-Zehnder interferometer so as to convert a phase difference between the first and second replicas to the correct intensity profile of the first portion of light signal in each chirped pulse.

8. The sub-ns pulsed laser system of claim 1 further comprising:
a second RF generator scheme configured identically to the one RF generator scheme and receiving a fraction of the second portion of the light signal to generate a second RF signal, the intensity modulator being the Mach-Zehnder interferometer provided with first and second waveguide arms which guide respective replicas of the first portion of light signal, the first and second arms including respective one and second phase modulators which receive amplified first and second RF signals with different amplitudes from respective one and second RF generator schemes, the one and second RF signals inducing a phase shift on both replicas of the first portion of light signal which interfere at an output of the Mach-Zehnder interferometer so as to convert a phase difference between the first and second replicas to the correct intensity profile of the first portion of light signal in each chirped pulse.

9. The sub-ns pulsed laser system of claim 1 further comprising
a second RF generator scheme operative to generate a second RF signal;
a second tunable RF amplifier operative to amplify the second RF signal having an amplitude different from the RF signal generated by the one RF generator scheme, the intensity modulator being a Mach-Zehnder interferometer provided with first and second waveguide arms which guide respective replicas of the first portion of light signal, the first and second arms including respective one and second phase modulators which receive respective amplified RF signals, the first and second RF signals inducing respective phase shifts on the first and second replicas of the first portion of light signal which are interposed at an output of the Mach-Zehnder interferometer so as to convert a phase difference between the first and second replicas to the correct intensity profile of the first portion of light signal in each chirped pulse.

10. The sub-ns pulsed laser system of claim 9 further comprising
a first fiber delay component between the beam splitter and one optoelectronic component;
an additional fiber coupler located between the first fiber delay component and one optoelectronic converter and operative to split the second portion of the light signal into first and second fractions,
an additional fiber delay component between the additional coupler and the second RF signal generator schemes, wherein the first and second fiber delay components are configured to provide respective fractions of the second portion of light signal with such a time delay that the first and second RF signals are applied across respective phase modulators synchronously with respective replicas of the first portion of light signal, wherein the additional time delay component includes a multi part spool with a fiber wrapped around multiple parts which are controllably displaceable relative to one another.

11. The sub-ns pulsed laser system of claim 1, wherein the intensity modulator is a semiconductor optical amplifier receiving the first RF signal to selectively provide gain to the first portion of light signal so as to obtain the correct intensity profile at an output of the semiconductor optical amplifier.

12. The sub-ns pulsed laser system of claim 1, wherein the RF generator scheme operates at
a relatively high frequency ranging between 5 and 500 GHz to correct intensity ripples in the first portion of signal light at the output of the intensity modulator, or
at a relatively low frequency of up to 2 GHz to provide each pulse of the modulated first portion of signal light with a parabolic shape in temporal and spectral domains.

* * * * *